United States Patent
Colvin et al.

(10) Patent No.: US 7,568,383 B2
(45) Date of Patent: Aug. 4, 2009

(54) PORTABLE VEHICLE EXHAUST FLOW SENSOR

(75) Inventors: Alex Colvin, Oak Park, MI (US); James Butler, Livonia, MI (US); Thomas Korniski, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 997 days.

(21) Appl. No.: 10/709,704

(22) Filed: May 24, 2004

(65) Prior Publication Data

US 2005/0257605 A1 Nov. 24, 2005

(51) Int. Cl.
G01M 15/10 (2006.01)

(52) U.S. Cl. .................................. 73/114.76

(58) Field of Classification Search .............. 73/114.69, 73/114.71, 114.74, 114.75, 114.76
See application file for complete search history.

(56) References Cited

U.S. PATENT DOCUMENTS

| | | | |
|---|---|---|---|
| 4,492,079 A * | 1/1985 | Takagi et al. ................... 60/274 |
| 5,419,178 A * | 5/1995 | Decker et al. .............. 73/23.31 |
| 5,722,357 A | 3/1998 | Choi |
| 5,750,892 A | 5/1998 | Huang et al. |
| 5,758,614 A | 6/1998 | Choi |
| 5,837,903 A * | 11/1998 | Weigand .................. 73/861.42 |
| 5,924,398 A | 7/1999 | Choi |
| 5,947,082 A | 9/1999 | Choi et al. |
| 6,148,656 A | 11/2000 | Breton |
| 6,196,187 B1 | 3/2001 | Zubeck et al. |
| 6,347,519 B1 | 2/2002 | Kreso |
| 6,470,732 B1 * | 10/2002 | Breton ....................... 73/23.31 |
| 6,588,210 B2 | 7/2003 | Kreso |

* cited by examiner

Primary Examiner—Eric S McCall
(74) Attorney, Agent, or Firm—Julia Voutyras; Brooks Kushman P.C.

(57) ABSTRACT

A portable exhaust gas flow sensor includes a tube for coupling to an exhaust pipe of a vehicle. The tube includes a circular flow restricting element to induce a pressure drop based on the exhaust gas flow with an upstream port and a downstream port relative to the flow restricting element connected to a differential pressure transducer. A thermocouple extends through a temperature port to measure exhaust gas temperature flowing through the tube. A processor in communication with the thermocouple and the differential pressure transducer determines the exhaust gas flow based on the differential pressure and the temperature. The circular flow restricting element includes sufficient spaces to resist formation of condensation and minimize added back pressure while providing an accurately measurable pressure drop for flows ranging from idle to full throttle.

3 Claims, 6 Drawing Sheets

PORTABLE VEHICLE EXHAUST FLOW SENSOR

BACKGROUND OF INVENTION

1. Field of the Invention

The present invention relates to systems and methods for measuring exhaust gas flow rate of a vehicle.

2. Background Art

An accurate determination of the exhaust gas volumetric flow rate of a vehicle is useful for hardware, software, and calibration development in addition to testing compliance with various environmental regulations. While measurement of exhaust gas flows under actual operating conditions is preferable, it is often impractical with currently available devices. Instead, a vehicle or engine is operated under controlled conditions to simulate actual driving or operating conditions. Vehicle exhaust gases exhibit a wide range of flow rates and temperatures corresponding to varying operating modes and ambient conditions, which presents challenges to accurate flow rate measurement. Although a number of devices have been developed to measure exhaust gas flow rates, all have various disadvantages.

Hot wire anemometer-type devices have been used to provide exhaust gas flow rate measurement but experience measurement errors associated with pulsating or reversing flows that may occur during idling of gasoline engines, for example. In diesel engine applications, these devices may experience soot accumulation contributing to measurement errors and durability concerns. Conventional differential pressure devices and laminar flow devices place one or more obstructions in the exhaust stream to generate a pressure drop and determine flow based on the differential pressure between upstream and downstream pressure transducers. However, these devices produce an undesirable increase in back pressure, which may adversely affect engine operation and result in measurements that do not reflect actual operating conditions. In addition, laminar flow devices are typically too heavy for portable use on a vehicle without additional reinforcement, contribute undesirable thermal capacity to the system, and do not have the desired operating range for use as a portable on-board measuring device. Formation of condensation on the flow measuring devices, especially during cold starts, may also result in measurement errors.

SUMMARY OF INVENTION

Systems and methods for determining exhaust gas flow of a vehicle according to the present invention provide a tube for coupling to an exhaust pipe of a vehicle having a circular flow restricting element to induce a pressure drop based on the exhaust gas flow with an upstream port and a downstream port relative to the flow restricting element connected to one or more differential pressure transducers. A thermocouple extends through a temperature port to measure temperature of exhaust gas flowing through the tube. A processor in communication with the thermocouple and the differential pressure transducer(s) determines the exhaust gas flow based on the differential pressure and the temperature.

Embodiments of the present invention include a method for real-time determination of exhaust gas flow through an exhaust pipe of a vehicle. One method includes measuring a pressure difference upstream and downstream of a screen, measuring exhaust gas temperature, and determining the exhaust gas flow based on the pressure difference and the temperature. The exhaust gas flow may be determined based on a square root of the quotient of the pressure difference and the temperature, based on empirically determined exponents of the differential pressure and temperature, or based on a quadratic equation depending on the particular application. The screen preferably includes sufficient spacing to resist formation of condensation and minimize added back pressure while providing a measurable pressure drop to accurately determine exhaust gas flow from idle through full throttle operating conditions.

Embodiments of the present invention also include a portable exhaust gas flow sensor for real-time on-board measurement of exhaust gas flow from a vehicle that includes a straight tube for connecting to an exhaust pipe of the vehicle. The tube includes a flow restriction element to generate a pressure drop as exhaust gas flows across the element, an upstream port for measuring pressure upstream of the element, a downstream port for measuring pressure downstream of the element, and a thermocouple port for measuring exhaust gas temperature. One or more differential pressure transducers in communication with the upstream and downstream ports generate signal(s) based on the pressure difference between the upstream and downstream ports. A thermocouple in communication with the thermocouple port generates a signal based on temperature of exhaust gas flowing through the straight tube. A processor receives the signals from the differential pressure transducer(s) and the thermocouple and determines exhaust gas flow based on the received signals.

The present invention provides a number of advantages. For example, the present invention provides a portable exhaust flow sensor capable of accurately determining exhaust gas flows from idle through full throttle in real-time. The circular flow restricting element of the present invention includes sufficient spaces to resist formation of condensation and minimize added back pressure while providing an accurately measurable pressure drop for a wide range of flows. Systems and methods for determining exhaust gas flows according to the present invention provide accurate measurement of pulsating or reversing flows, such as those that may occur at idle in gasoline engines. In various embodiments, measurement sensitivity across the range of expected exhaust flows is improved by using two or more differential pressure transducers. Use of a thin screen or similar flow restriction element does not significantly increase the thermal capacity of the system and facilitates portability compared to conventional laminar flow measurement devices.

The above advantage and other advantages, objects, and features of the present invention will be readily apparent from the following detailed description of the preferred embodiments when taken in connection with the accompanying drawings.

DETAILED DESCRIPTION

Figure 1:
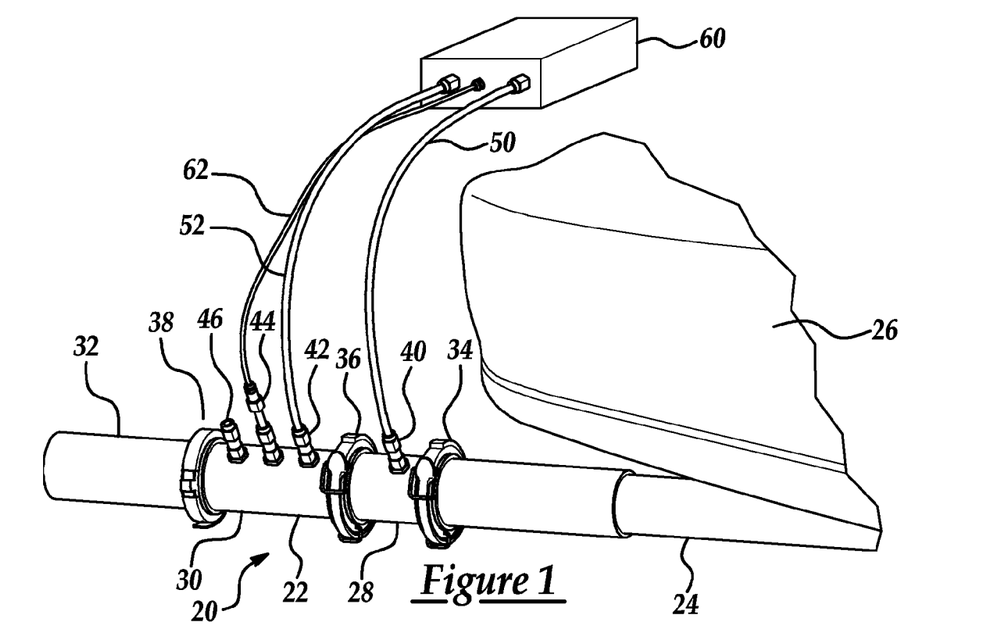
FIG. 1 is a perspective view of a representative installation of a vehicle exhaust gas flow sensor according to one embodiment of the present invention.

FIG. 1 is a perspective view of a representative installation for a vehicle exhaust gas flow sensor according to one embodiment of the present invention. As shown in FIG. 1, exhaust flow sensor 20 includes a tube 22 adapted for coupling to an exhaust (or tail) pipe 24 of a vehicle 26. As explained in greater detail below, exhaust flow sensor 20 may be used to measure exhaust gas flow and optionally sample exhaust gas for a variety of engine types and sizes including gasoline and diesel engines, for example. Similarly, exhaust flow sensor 20 may be adapted for installation on various types and sizes of engine exhaust pipes for real-time exhaust flow measurement during actual operation of the engine, including engines installed in automotive vehicles, marine vehicles, construction vehicles and equipment, etc.

In the embodiment illustrated in FIG. 1, tube 22 of exhaust flow sensor 20 includes a first (upstream) section or portion 28, a second (downstream) section or portion 30, and a third (tailpipe) section or portion 32. As used throughout the description of the invention, "upstream" and "downstream" are relative terms with the exhaust flowing from upstream toward downstream sections. The term "upstream" refers to any element or component located closer to the engine relative to a "downstream" component so that the "upstream" element or component receives the exhaust flow before an associated "downstream" element or component. Because they are relative terms, a single component or section may be referred to as upstream relative to one component and downstream relative to another. For example, section 30 of tube 22 is downstream relative to section 28, but upstream relative to section 32.

The various portions or sections of tube 22 may be removably or permanently coupled depending upon the particular application and implementation. In the embodiment of FIG. 1, the sections of tube 22 are removably coupled using Marman flanges, gaskets or seals (not shown), and corresponding clamps 34, 36, and 38. A removable coupling facilitates placement of a flow restriction element at clamp 36 between upstream section 28 and downstream section 30, which induces a pressure drop based on the exhaust gas flow as described in greater detail below.

Tube 22 includes an upstream pressure port 40, a downstream pressure port 42, a thermocouple port 44, and an optional exhaust gas sampling port 46. The various ports are preferably positioned on the side or top of tube 22 so they are not affected by any condensation that may form within tube 22. Ports 40, and 42 (and optional port 46) preferably include any suitable coupling to removably fluidly couple tube 22 to processing device 60. In the embodiment illustrated, Teflon tubes 50, 52 are connected to threaded couplings fixed to tube 22 to fluidly couple the interior of tube 22 to processing device 60. A similar threaded coupling is used to hold a thermocouple in port 44 to measure exhaust gas temperature, with the thermocouple being electrically coupled or in communication with processing device 60 via one or more wires or conductors 62.

Figure 4:
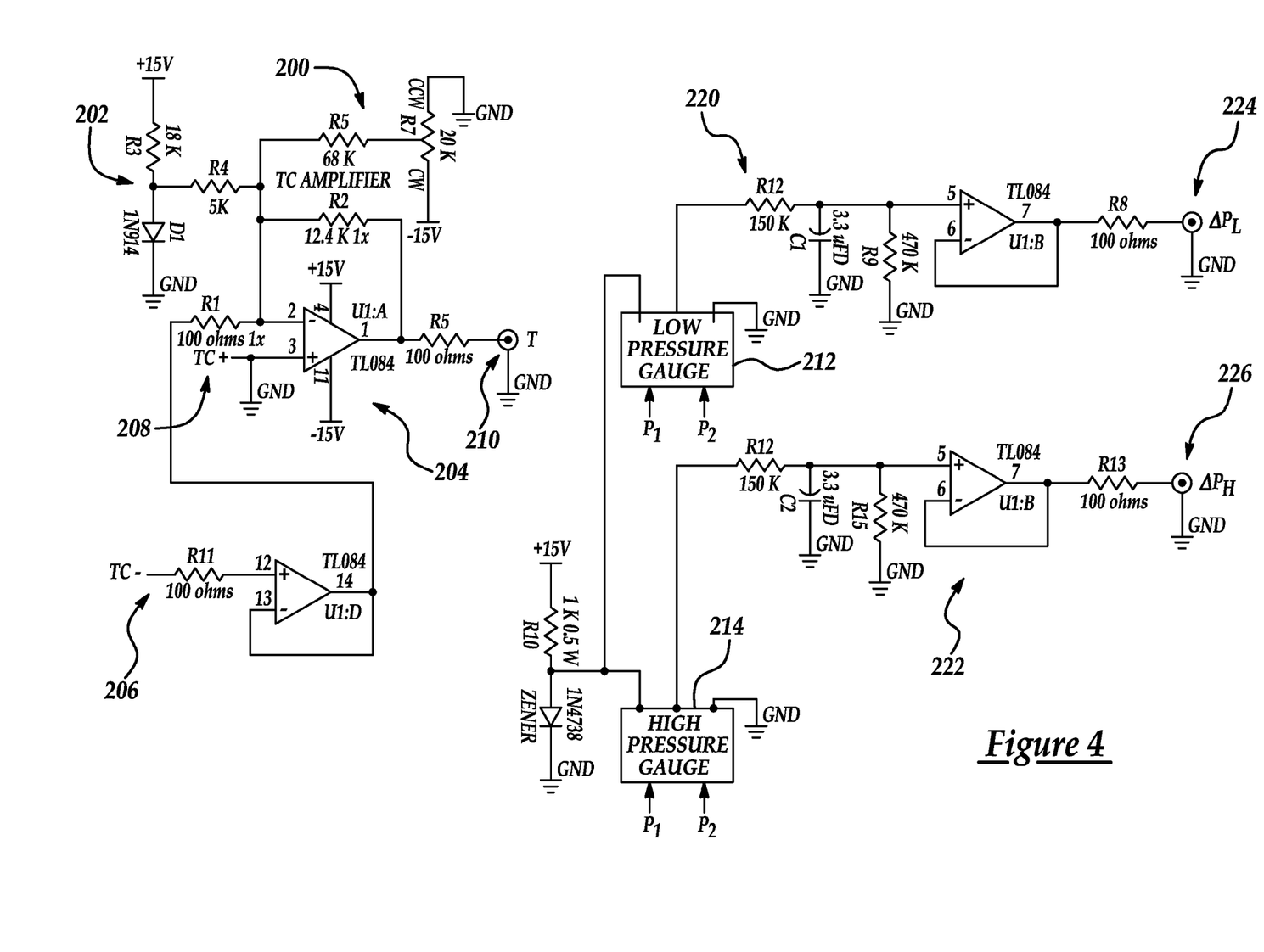
FIG. 4 is a circuit diagram illustrating signal conditioning circuitry for a thermocouple and dual differential pressure transducers according to one embodiment of the present invention.

Processing device 60 preferably includes one or more differential pressure transducers and associated signal conditioning circuitry (such as illustrated in FIG. 4, for example) to generate at least one signal based on the differential pressure upstream and downstream of the flow restriction device (not show) placed between sections 28 and 30. In addition, processing device 60 preferably includes thermocouple signal conditioning circuitry and may include control logic in the form of circuitry and/or a programmed microprocessor to determine exhaust flow based on the differential pressure and temperature of the exhaust gas. Alternatively, processing device 60 may simply condition and amplify the differential pressure and temperature signals and communicate the signals (by wire or wirelessly) to another processing device or computer located in vehicle 26 or remotely that calculates the exhaust flow. Processing device 60 may be located or mounted in any convenient location on tube 22 or within vehicle 26.

In operation, exhaust flowing from vehicle 26 through tailpipe 24 flows into upstream section 28 of tube 22 and through a circular flow restriction element positioned within tube 22 at clamp 36 creating a differential pressure between upstream port 40 and downstream port 42. The temperature of the exhaust gas flowing through downstream section 30 is measured by a thermocouple passing through port 44. Processing device 60 includes at least one differential pressure transducer and associated circuitry to generate a signal based on the differential pressure between upstream port 40 and downstream port 42, which varies based on the exhaust flow and temperature. Processing device 60 or an associated computer then determines be exhaust flow based on the differential pressure and the temperature as described in greater detail below.

Figure 2:
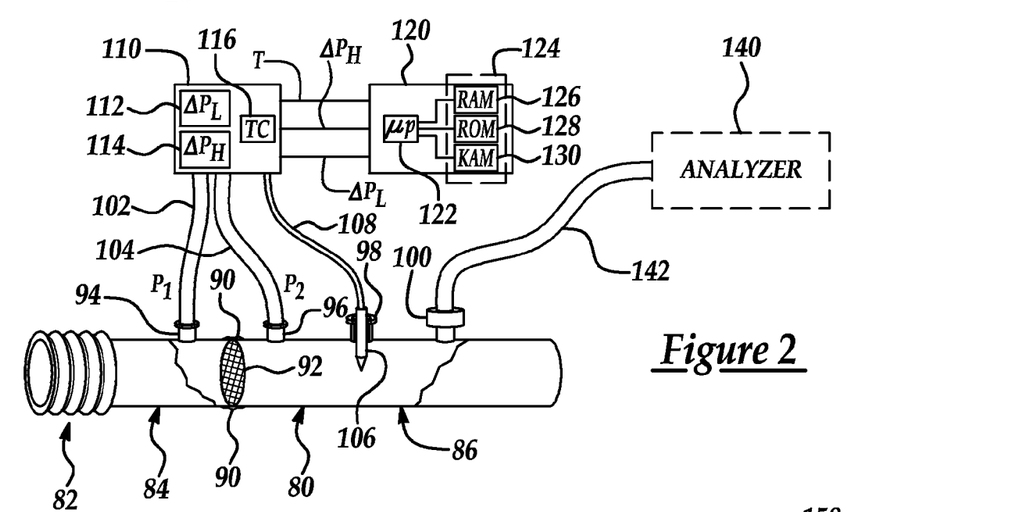
FIG. 2 is a partial cut-away view of one embodiment of a vehicle exhaust gas flow sensor using a screen to create a pressure differential according to the present invention.

FIG. 2 is a partial cut-away view of one embodiment of a vehicle exhaust flow sensor using a screen to create a pressure differential according to the present invention. The exhaust gas sensor of FIG. 2 includes a straight tube or pipe 80 adapted for coupling to the exhaust pipe of a vehicle using an elastomeric boot 82, preferably constructed of high temperature silicone rubber. In this embodiment, tube 80 includes an upstream section 84 and a downstream section 86 permanently connected by a circumferential weld 90. During assembly of upstream section 84 and downstream section 86, a flow restriction element 92 is placed between the sections and held in place by weld 90. In this embodiment, the flow restriction element is implemented by a screen, preferably constructed of stainless steel or nickel chromium. As illustrated in FIG. 2, screen 92 or other flow restriction element is preferably a circular element that extends across a cross-sectional area of tube 80 and includes a plurality of strands or wires arranged in an array with the spacing selected to reduce or eliminate formation of condensation under normal operating conditions, while providing a measurable differential pressure for exhaust flows ranging from engine idle to full throttle. In addition, the flow restriction element should be selected to minimize increased back pressure which may otherwise affect operation of the engine and lead to measurements which do not accurately reflect actual operating conditions. Use of a straight tube may help to stabilize the additional back pressure created by the exhaust flow sensor.

As illustrated in FIG. 2, use of a screen or similar element provides a circular or disk-shaped flow restriction element having regularly spaced openings. For one representative application, a six mesh stainless steel screen constructed using stainless steel wire having a diameter of 0.035 inches (0.889 mm) and openings of 0.1317 inches (3.345 mm) was used to provide an opening or flow area of 62.7% of the cross-sectional area of tube 80. The relatively thin flow restriction element implemented by a screen resulted in an increase of back pressure of approximately 5.2% which is within the range of normal barometric pressure variation. In addition, formation of condensation was reduced or eliminated so that it did not adversely affect the accuracy of flow measurements. For a typical automotive application, a screen mesh of ten or less is preferred to provide a flow area or spacing of between 60 and 65% of the cross-sectional area of the tube. However, those of ordinary skill in the art will recognize various alternative implementations of a flow restriction element having the characteristics of the screen described with respect to the representative embodiment consistent with the teachings of the present invention. Construction of the flow restriction element including material properties and spacing of apertures may vary depending upon the expected flow ranges, the sensitivity of the differential pressure transducer(s), composition of the exhaust gas, desired measurement accuracy, etc.

As also illustrated in FIG. 2, straight tube 80 includes an upstream port 94 (relative to screen 92) and a downstream port 96 (relative to screen 92). A thermocouple port 98 may be positioned anywhere along tube 80 but is preferably positioned downstream of port 96 as shown. An optional gas sampling port 100 may also be provided, if desired, for sampling and analysis of the exhaust gas by an optional exhaust gas analyzer 140 connected to port 100 via fluid coupling 142. The volumetric flow rate determined by the present invention can be used to determine mass flow or mass of exhaust gas components based on concentrations detected by analyzer 140, if desired. Upstream pressure port 94 is in communication with processing device 110 via a flexible or rigid fluid coupling 102 while downstream pressure port 96 is in communication with processing device via a flexible or rigid fluid coupling 104. Depending upon the particular application, processing device 110 may include one or more differential pressure transducers. In the embodiment of FIG. 2, a first differential pressure transducer 112 is used to detect a first range of exhaust flows while a second differential pressure transducer 114 is used to detect a second range of the exhaust flows. The detection range of second differential pressure transducer 114 may overlap the detection range of first differential pressure transducer 112. For example, in one embodiment, first differential pressure transducer 112 detects differential pressures between 0.0-0.1 inches of water ("$H_2O$") and generates a corresponding output signal of 0.0-5.0 volts (V), while second differential pressure transducer 114 detects differential pressures between 0.0-25.0 inches of water ("$H_2O$") and generates a corresponding output signal of 0.0-5.0 volts (V).

Processing device 110 may also include thermocouple circuitry 116 to process a temperature signal generated by thermocouple 106, which preferably extends into the middle of the exhaust flow, and communicated to processing device 110 by one or more wires 108. Processing device 110 may generate, condition, and amplify analog and/or digital signals which are provided to computer 120 to determine or calculate the exhaust flow. The signals preferably include a temperature signal and one or more differential pressure signals depending upon the number of differential pressure transducers. Computer 120 includes control logic in the form of hardware and/or software to determine exhaust flow based on the differential pressure and temperature signals. Depending upon the particular application and implementation, the differential pressure and temperature signals may be communicated via one or more wires as analog or digital signals, or wirelessly using proprietary or standard communication protocols. Although illustrated as a separate device, the functions of computer 120 may be incorporated into processing device 110 if desired. Computer 120 preferably includes a microprocessor 122 in communication with one or more types of computer readable storage media 124. The computer readable storage media may include a random-access memory (RAM) 126, a read-only memory (ROM) 128, and a keep-alive memory (KAM) 130, for example. The computer-readable storage media may be implemented using any of a number of known temporary and/or persistent memory devices such as PROMs, EPROMs, EEPROMs, flash memory, or any other electric, magnetic, or optical memory capable of storing data, code, instructions, calibration information, operating variables, and the like used by microprocessor 122 in determining exhaust flow according to the present invention. Although the flexibility afforded by a microprocessor is preferred, those of ordinary skill in the art will recognize various alternative implementations for calculating exhaust flow according to the present invention using dedicated processing circuitry that may be particularly suited to a specific application, which may include application specific integrated circuits (ASIC's) or various types of programmable gate arrays (PGA's) for example.

Figure 3:
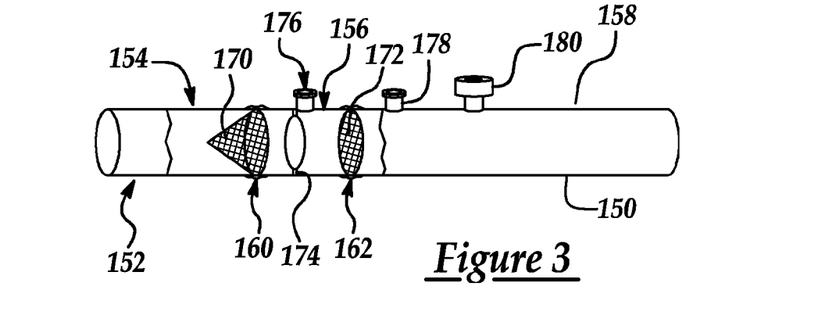
FIG. 3 is a partial cut-away view of another embodiment of a vehicle exhaust gas flow sensor using a condensation trap and screen according to the present invention.

FIG. 3 is a partial cut-away view of another embodiment of a vehicle exhaust gas flow sensor using a condensation trap and screen according to the present invention. In the embodiment of FIG. 3, straight tube 150 includes a tapered or stepped section 152 adapted to engage or couple with an engine exhaust pipe. Tube 150 includes a first section 154, second section 156, and third section 158. First section 154 is permanently joined to second section 156 by a circumferential weld 160. During assembly, a condensation trap is installed in either first section 154 and/or second section 156. As illustrated in FIG. 3, a preferred implementation of a condensation trap includes a conical screen 170 positioned with its apex upstream and base downstream. In addition, a baffle 174 is provided to reduce or eliminate splashing or migration of condensate downstream of baffle 174. In one embodiment, a 100 mesh conical screen constructed of stainless steel was used to trap condensation. Of course the particular implementation may vary depending upon the application and operating conditions.

As also illustrated in FIG. 3, second section 156 is permanently joined to third section 158 by a circumferential weld 162. During assembly, a flow restriction device 172 is inserted between second section 156 and third section 158 and may also be held in place by weld 162. Tube 150 includes an upstream pressure port 176, a downstream pressure port 178, and a temperature port 180 but may be used to determine a differential pressure across restriction element 172 and temperature of the exhaust gas, respectively. Ports 176, 178, and 180 may be connected to an appropriate processing device or computer to determine the exhaust flow based on the differential pressure and temperature according to the present invention.

FIG. 4 is a circuit diagram illustrating representative signal conditioning circuitry for a thermocouple and parallel differential pressure transducers according to one embodiment of the present invention. In this embodiment, thermocouple processing circuitry 200 uses a diode 202 to generate a desired cold junction reference voltage for the thermocouple. A temperature signal is received from the thermocouple, which preferably extends to the center of the exhaust flow, at inputs 206 and 208. The signal is amplified and filtered by amplifier 204 to provide a temperature output signal at 210 of five millivolts (mV) per degree Celsius (C).

As also illustrated in FIG. 4, fluid couplings simultaneously transmit pressure from the upstream ($P_1$) and downstream ($P_2$) pressure ports of the straight tube to a first differential pressure transducer 212 and a second differential pressure transducer 214. Each pressure transducer 212, 214 simultaneously measures the differential pressure across the flow restriction element of the flow sensor and generates a corresponding voltage signal that is filtered and amplified by associated circuitry 220 and 222. Corresponding analog output voltage signals are provided at 224 and 226. In one preferred embodiment, differential pressure transducer 212 (manufactured by Omega, Model PX653-0.1D5V) is used to measure a first range of exhaust flows with differential pressure transducer 214 (manufactured by Omega, Model PX653-25D5V) used to measure a second, higher range of exhaust flows. The temperature signal and two differential pressure signals may then be converted from analog to digital signals by any appropriate analog to digital converter (not shown) within the processing device or computer, such as a Model PCM DAS16/16 AO manufactured by Measurement Computing Corp., for example. The digital signals are then communicated to control logic to determine the exhaust flow in real-time.

The diagrams of FIGS. 5, 6, 10, and 12 generally represent operation of a system or method for determining exhaust flow according to embodiments of the present invention. Preferably, the illustrated logic is implemented primarily in software executed by a microprocessor-based computer or controller. Of course, the logic may be implemented in software, hardware, or a combination of software and hardware depending upon the particular application. When implemented in software, the logic is preferably provided in a computer-readable storage medium having stored data representing instructions executed by a computer to determine the exhaust flow of an engine in real time. The computer-readable storage medium or media may be any of a number of known physical devices which utilize electric, magnetic, and/or optical devices to temporarily or persistently store executable instructions and associated calibration information, operating variables, and the like. As will be appreciated by one of ordinary skill in the art, the diagrams may represent any one or more of a number of known software processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages of the invention, but is provided for ease of illustration and description. Although not explicitly illustrated, one of ordinary skill in the art will recognize that one or more of the illustrated steps or functions may be repeatedly performed.

Figure 5:
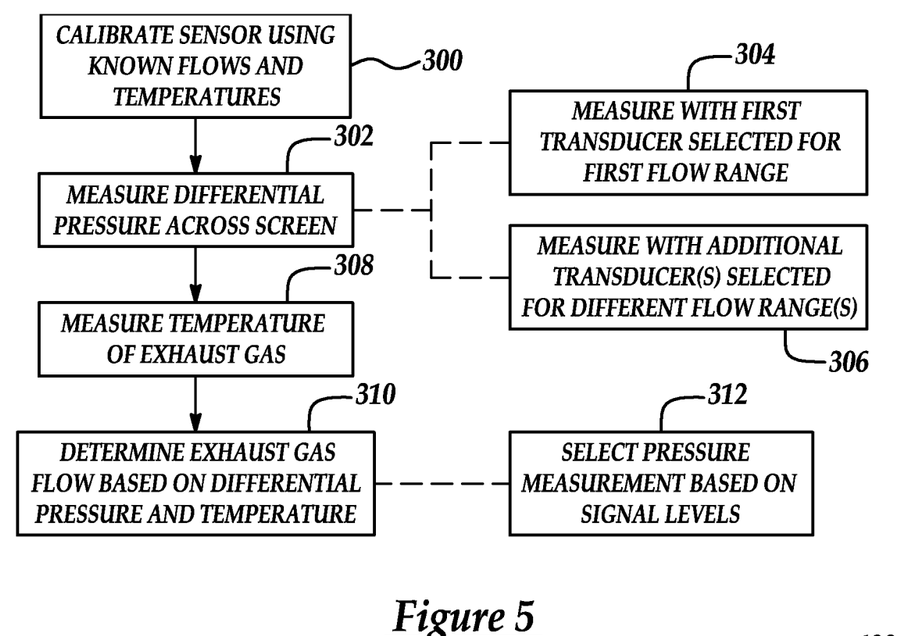
FIG. 5 is a flow chart illustrating operation of a system or method for determining exhaust flow according to various embodiments of the present invention.

FIG. 5 is a flow chart illustrating operation of a system or method for determining exhaust flow according to various embodiments of the present invention. The exhaust flow sensor is calibrated using known flows and temperatures to determine various parameters used in the real-time determination of exhaust flow as represented by block 300. During operation of the exhaust sensor, differential pressure across a screen or other flow restriction element is measured as represented by block 302. The differential pressure may optionally be measured with a first transducer selected for a first flow range as represented by block 304 as well as one or more additional transducers selected for other flow ranges as represented by block 306. The temperature of the exhaust gas is then measured as represented by block 308. The exhaust gas flow is then determined based on the differential pressure and temperature as represented by block 310. For applications that utilize more than one differential pressure transducer, a pressure measurement signal may be selected corresponding to a current flow range as represented by block 312. Selection of a particular pressure measurement also includes combining one or more pressure measurements, such as taking an average for example. Alternatively, a single one of the pressure measurements may be selected to determine the exhaust gas flow. For example, in one embodiment using parallel differential pressure transducers, the first transducer measures differential pressures ranging from 0-1 "$H_2O$ corresponding to a first flow range and generates an output of 0-5 volts (V). The second transducer measures differential pressures ranging from 0-28 "$H_2O$ corresponding to a second flow range and generates an output of 0-5 volts (V). The signal from the first pressure transducer is selected for determination of the exhaust gas flow until it approaches its measurement limit or saturation, i.e. 4.9 volts (V) in this example. The signal from the second pressure transducer is selected for determination of the exhaust gas flow when the signal from the first transducer exceeds 4.9 volts (V).

Figure 6:
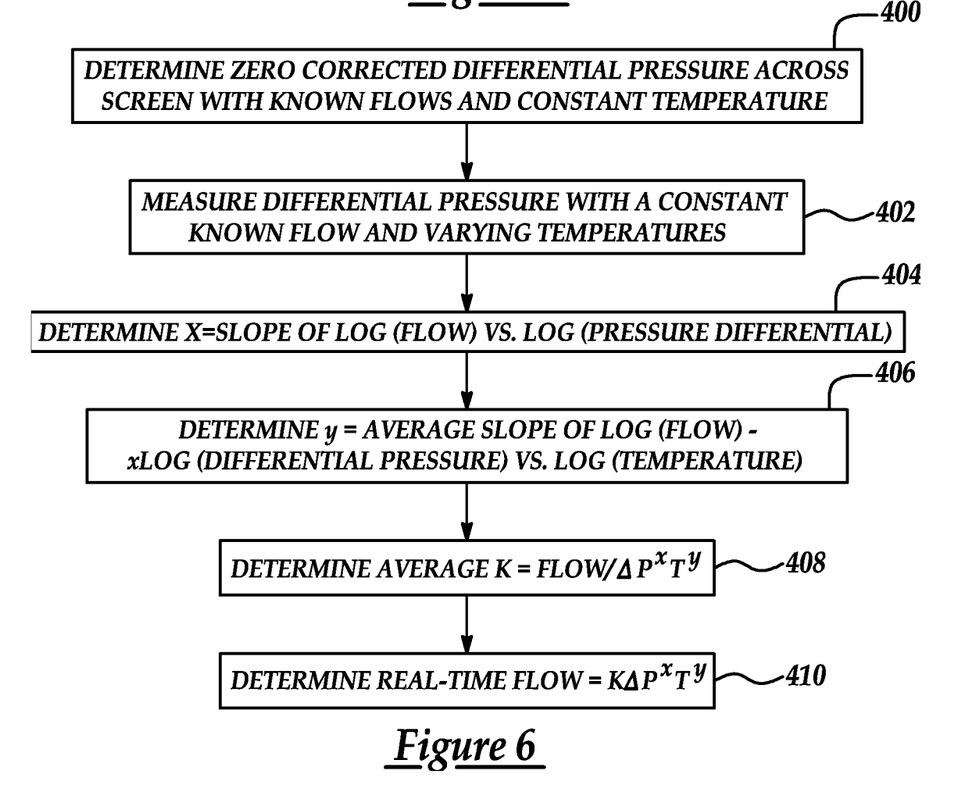
FIG. 6 is a flow chart illustrating operation of a system or method for determining exhaust flow according to one embodiment of the present invention.
Figure 7:
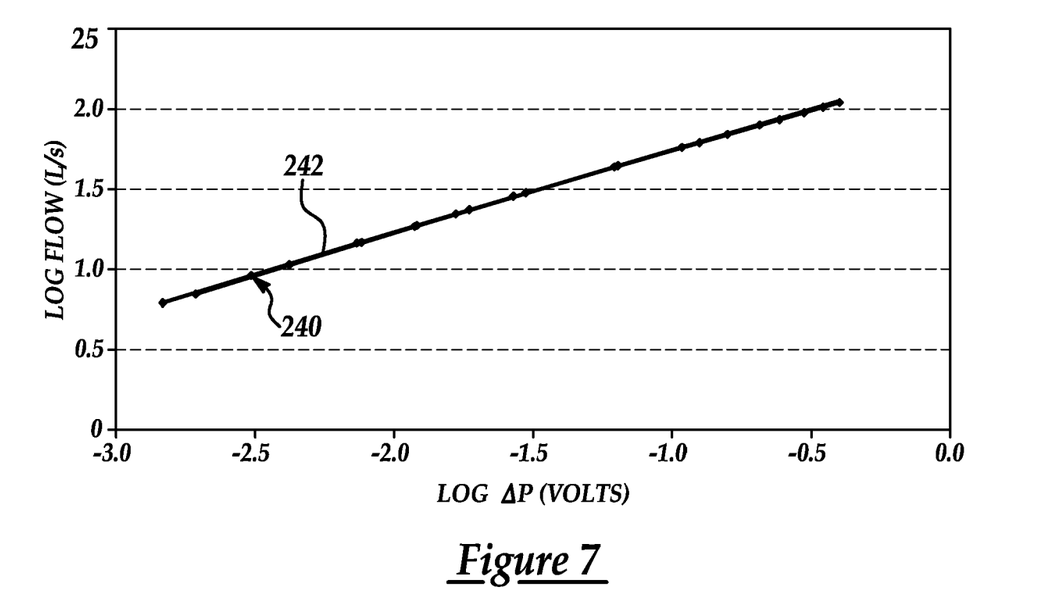
FIG. 7 is a plot used in calibrating an exhaust flow sensor to empirically determine parameters used for calculating real-time exhaust flow according to one embodiment of the present invention.

FIG. 6 is a flow chart illustrating operation of a system or method for determining exhaust flow using an exponential instrument function according to one embodiment of the present invention. In the embodiment of FIG. 6, real-time exhaust flow is calculated according to: Flow=$K\Delta P^x T^y$ where $\Delta P$ represents the differential pressure, T represents the temperature of the exhaust, K is an empirically determined constant, and x and y are empirically determined exponents. The sensor is calibrated using known flows and temperatures to empirically determine the parameters K, x, and y used in the real-time determination of exhaust flow. Zero corrected differential pressure readings are taken across a flow restriction element using known flows and a constant temperature as represented by block 400. Differential pressure readings with a constant known flow in varying exhaust gas temperatures are then recorded as represented by block 402. This step is then repeated for a number of constant known flows across the expected operating range. The differential pressure readings and known flows of step 400 are used to determine the slope of log(flow) as a function of log(differential pressure) as represented by block 404, with the slope corresponding to the empirically determined value for the exponent "x". A representative plot used to determine a value for "x" based on the slope is illustrated in FIG. 7 with data points 240 used to fit a linear curve and determine its slope. In the example illustrated in FIG. 7, curve fit line 242 is represented mathematically by: a=0.5222b+2.2663 where "a" and "b" are the ordinate (vertical or y-axis coordinate) and abscissa (horizontal or x-axis coordinate), respectively, and which has a slope of 0.5222 for the value of the exponent "x".

Figure 8:
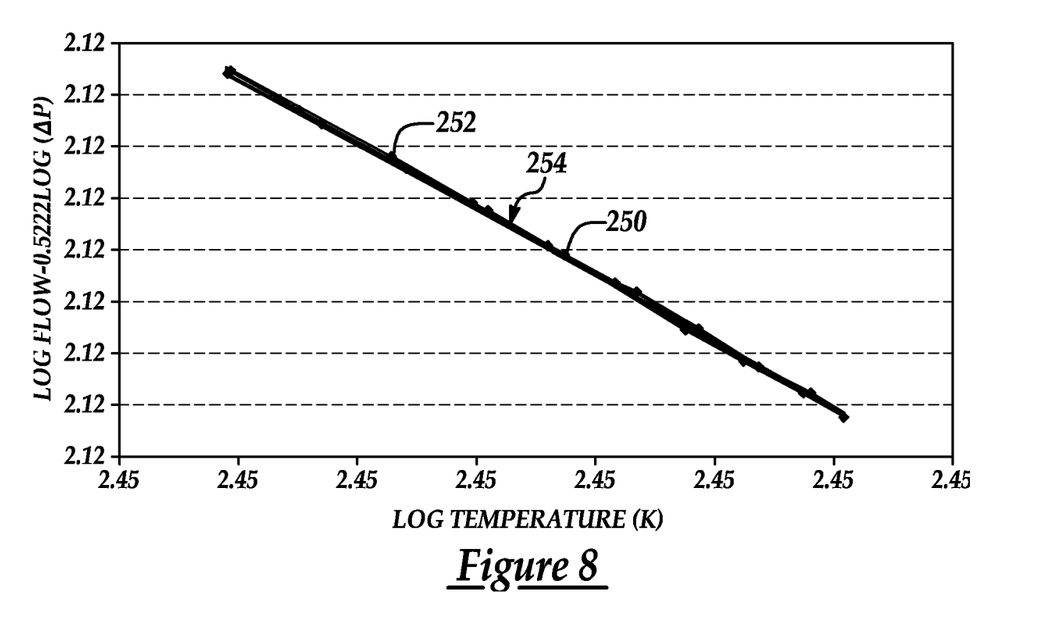
FIG. 8 is another plot used in calibrating an exhaust flow sensor to empirically determine parameters used for calculating real-time exhaust flow according to one embodiment of the present invention.

As represented by block 406 of FIG. 6 and illustrated in FIG. 8, a value for the exponent "y" is determined based on the average slope of lines corresponding to log(flow) xlog (differential pressure) as a function of log(temperature) with the temperature in degrees Kelvin for each data point and known flow condition determined in step 402. As illustrated in FIG. 8, each series of data points 250, 252 corresponding to measured differential pressures for a known flow (low flow and high flow in this example) and varying temperature is plotted for each of the known flows. The value of the exponent "y" is then determined based on the average slope for the selected flows. In the example illustrated in FIG. 8, a linear curve fit 254 is represented mathematically as a=−0.5167b−3.5894, which has a slope of −0.5167 corresponding to the empirically determined value for the exponent "y".

As represented by block 408 of FIG. 6, a value for the constant "K" is determined using the values of "x" and "y" by averaging K's determined at each data point of step 400 according to: $K=\text{Flow}/\Delta P^x T^y$. A representative empirically determined value for "K" based on the examples described above and data illustrated in FIGS. 7 and 8 is 3578. Using the empirically determined values for the constant "K" and the exponents "x" and "y", the real-time exhaust flow can then be calculated or determined based on the measured differential pressure and exhaust gas temperature during actual operation of the engine and/or vehicle as represented by block 410.

Figure 9:
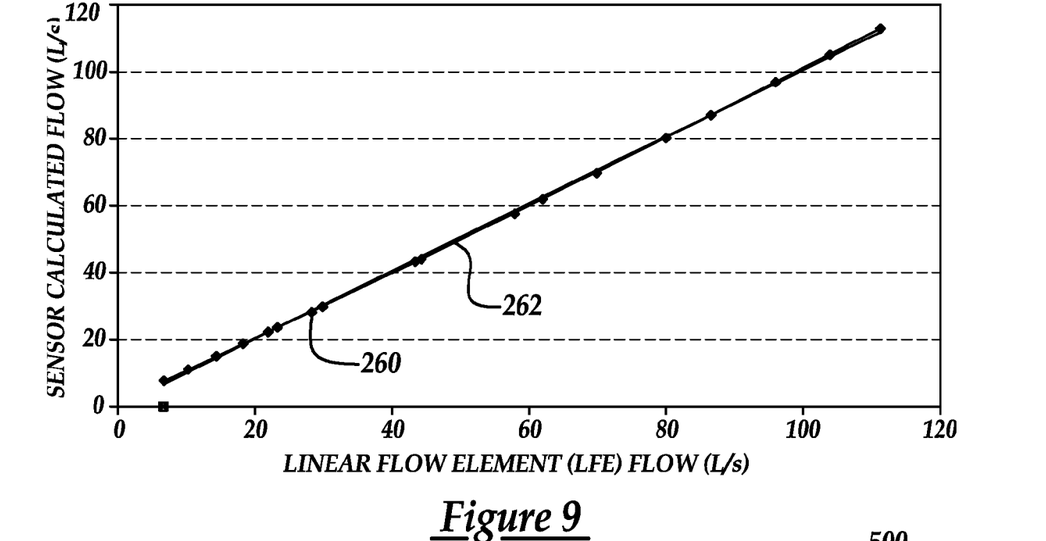
FIG. 9 is a plot illustrating accuracy of real-time calculated exhaust flow relative to a calibrated linear flow element according to one embodiment of the present invention.

FIG. 9 is a plot illustrating accuracy of real-time calculated exhaust flow relative to a calibrated linear flow element (LFE) according to one embodiment of the present invention. The calculated flow in liters/second was determined using the empirically determined parameters described above according to: $\text{Flow}=3578\,\Delta P^{0.5222} T^{-0.5167}$. The calculated exhaust flow correlates well with the calibrated linear flow element as illustrated by linear curve fit line 262 through data points 260 with an $R^2$ value of 0.9997.

Figure 10:
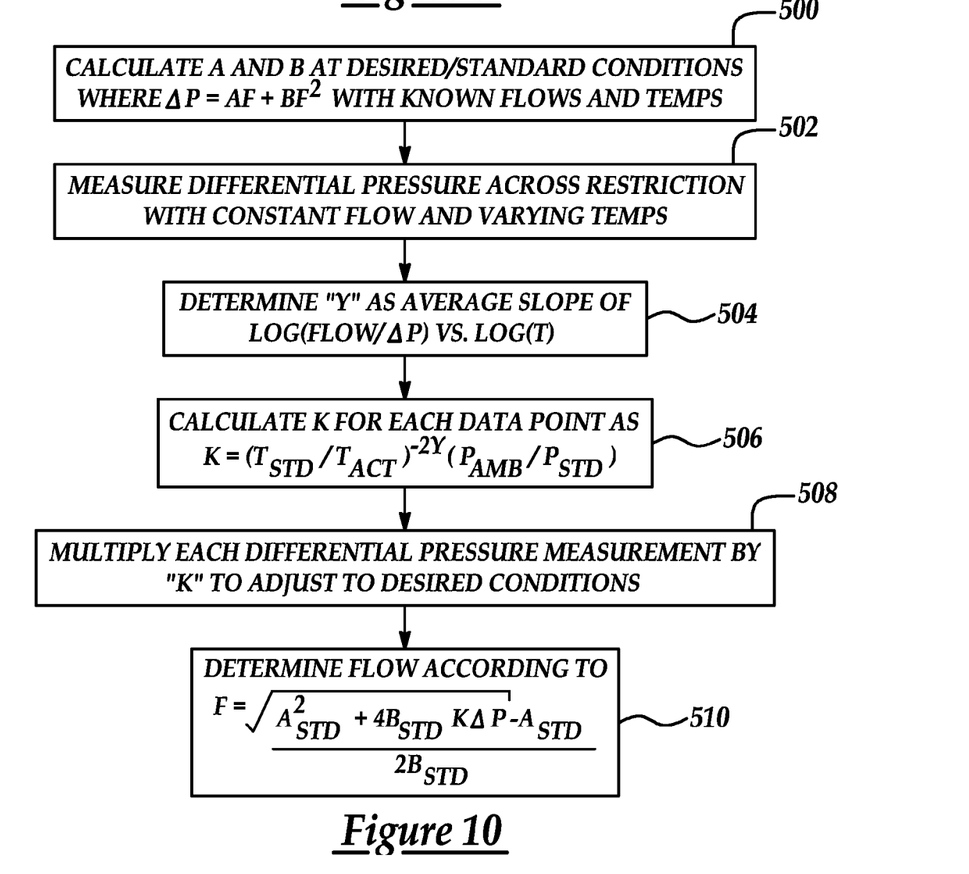
FIG. 10 is a flow chart illustrating operation of a system or method for determining exhaust flow according to a first alternative embodiment of the present invention.

FIG. 10 is a flow chart illustrating operation of a system or method for determining exhaust flow based on a quadratic calibration according to a first alternative embodiment of the present invention. The embodiment illustrated in FIG. 10 may be more susceptible to instrument-to-instrument measurement variation than the embodiment illustrated in FIGS. 6-9, however it has the ability to be more easily adjusted or calibrated in the field. The embodiment illustrated in FIG. 10 determines the exhaust flow based on a quadratic calibration represented by the general equation: $\Delta P=AF+BF^2$, where F represents the flow at standard (or desired) conditions, A and B are constants and $\Delta P$ is the differential pressure across the flow measuring element. The "standard" or "desired" reference conditions may vary based on the particular application. For example, standard conditions for vehicle engines are a pressure of 758 mm Hg and temperature of 100° F., while for other applications, standard conditions may be 760 mm Hg and 0° C., for example.

As represented by block 500 of FIG. 10, A and B are calculated at standard reference conditions with known flows and known temperatures. $A_{STD}$ is best determined from a low flow point and $B_{STD}$ is best determined from a high flow point. Differential pressure readings are obtained using a constant known flow and varying exhaust gas temperatures as represented by block 502. This step is then repeated for one or more additional known flows. An average slope is determined from plots of log(flow) log(differential pressure) as a function of log(temperature) for each known flow using the data points from step 502 as represented by block 504. The average slope, "Y", is used to determine a value for a constant, "K" for each data point according to:

$$K=(T_{STD}/T_{Actual})^{-2Y}(P_{Ambient}/P_{STD})$$

as represented by block 506. During real-time measurement of the exhaust flow, each differential pressure measurement is corrected to the standard or desired reference conditions by multiplying by "K" as represented by block 508 during calculation of the real-time flow (F) according to:

$$F=(\sqrt{A_{STD}^2+4B_{STD}K\Delta P}-A_{STD})/(2B_{STD})$$

as represented by block 510.

Figure 11:
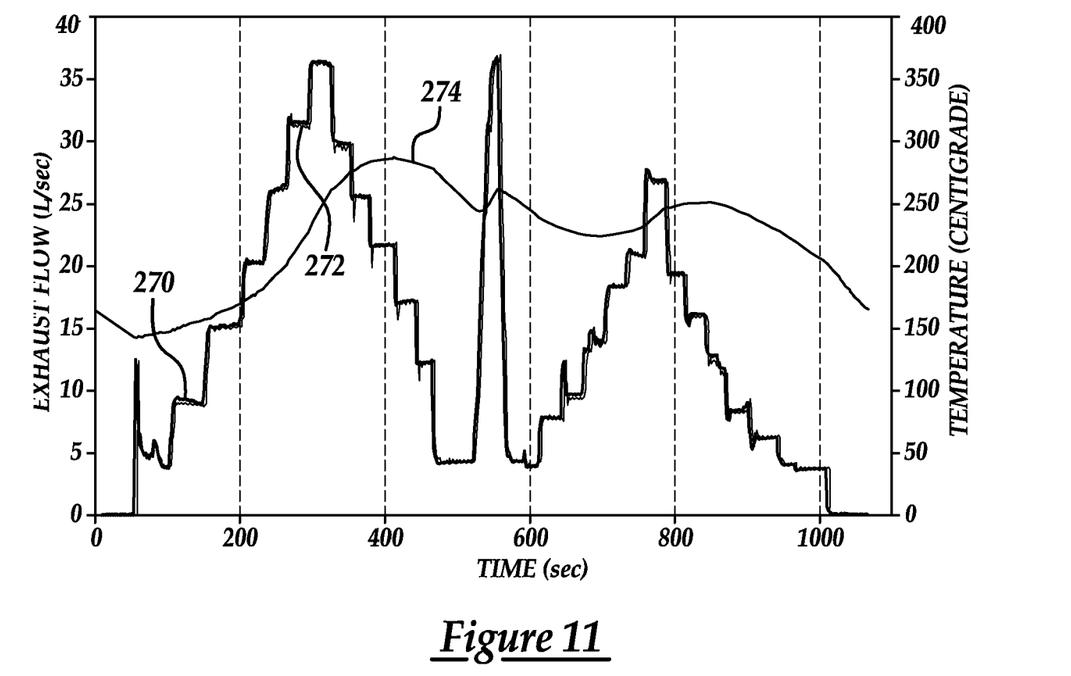
FIG. 11 is a plot illustrating accuracy of real-time calculated exhaust flow using a method as illustrated in FIG. 10 relative to an engine controller calculated exhaust flow according to the present invention.

FIG. 11 is a plot illustrating accuracy of real-time calculated exhaust flow using a method as illustrated in FIG. 10 relative to an engine controller calculated exhaust flow according to the present invention. Line 270 represents the calculated flow using a quadratic calibration while line 272 represents the flow calculated by the engine controller. Line 274 represents the temperature of the exhaust gas flowing through the flow sensor. As illustrated in FIG. 10, exhaust flow determined using a quadratic calibration according to the present invention provides good correlation with the exhaust flow calculated by the engine controller over a wide range of flows.

Figure 12:
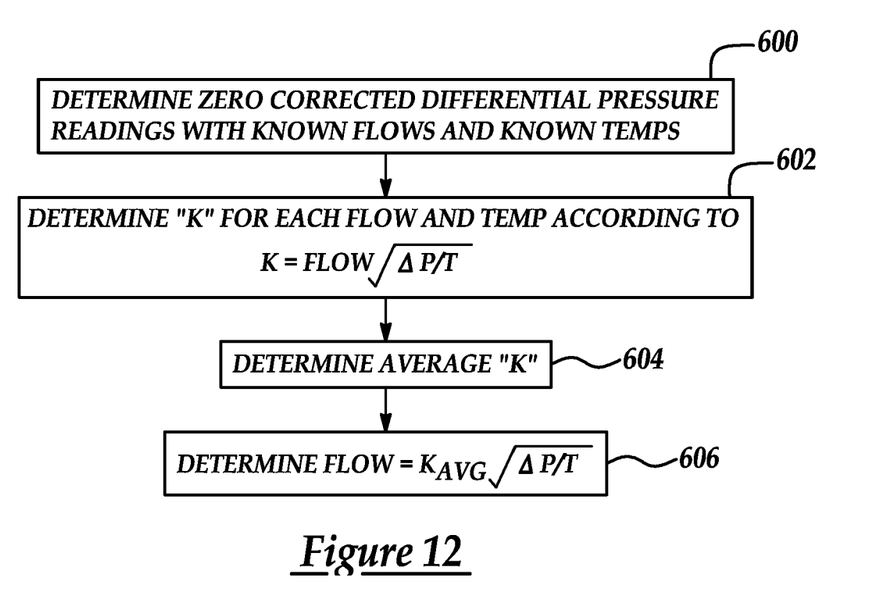
FIG. 12 is a flow chart illustrating operation of a system or method for determining exhaust flow according to a second alternative embodiment of the present invention.

FIG. 12 is a flow chart illustrating operation of a system or method for determining exhaust flow based on a square root instrument function according to a second alternative embodiment of the present invention. The instrument function used in the embodiment of FIG. 12 is an approximation of the instrument function used in the embodiment of FIGS. 6-9 and may provide acceptable results for many applications and is easier to calibrate. The square root instrument function for the flow sensor according to the present invention is described by the following general equation:

$$\text{Flow}=K\sqrt{\Delta P/T}$$

with the constant "K" empirically determined by first determining zero corrected differential pressure readings with known flows and known temperatures as represented by block 600. A "K" is then determined for each flow and temperature according to:

$$K=\text{Flow}/\sqrt{\Delta P/T}$$

as represented by block 602. An average "K" is then calculated as represented by block 604. The real-time exhaust flow can then be determined using the general equation with the empirically determined value for "K" and differential pressure and temperature readings obtained during operation of the engine as represented by block 606.

As such, the present invention provides a portable exhaust flow sensor capable of accurately determining exhaust gas flows from idle through full throttle in real-time using a circular flow restricting element, such as a screen, to provide an accurately measurable pressure drop for a wide range of flows while resisting formation of condensation and minimizing added back pressure. Furthermore, use of a thin screen or similar flow restriction element does not significantly increase the thermal capacity of the system and facilitates portability compared to conventional laminar flow measurement devices.

While the best mode for carrying out the invention has been described in detail, those familiar with the art to which this invention relates will recognize various alternative designs and embodiments for practicing the invention as defined by the following claims.

The invention claimed is:

1. A method for real-time determination of exhaust gas flow through an exhaust pipe of a vehicle, the method comprising:
   measuring a pressure difference upstream and downstream of a screen;
   measuring exhaust gas temperature; and
   determining the exhaust gas flow based on the pressure difference and the temperature,
   wherein the screen covers substantially the entire area of the exhaust pipe.

2. A method for real-time determination of exhaust gas flow through an exhaust pipe of a vehicle, the method comprising:
   measuring a pressure difference upstream and downstream of a screen;
   measuring exhaust gas temperature; and
   determining the exhaust gas flow based on the pressure difference and the temperature,
   wherein the screen includes about six strands per inch arranged in a generally rectangular array that extends across the exhaust pipe.

3. A portable system for determining exhaust gas flow of a vehicle, the system comprising:
   a tube adapted for placement on an exhaust pipe of the vehicle, the tube including a flow restricting element extending substantially entirely across a cross-sectional area of the tube, a first port disposed upstream of the flow restricting element for measuring a first pressure, and a second port disposed downstream of the flow restricting element for measuring a second pressure; and
   a device in communication with the tube for determining the exhaust gas flow based on a difference between the first and second pressures,
   wherein the flow restricting element comprises a screen and the screen comprises a plurality of strands arranged in a generally square array with less than ten strands per inch.

* * * * *